United States Patent [19] [11] 3,744,852
Riordan [45] July 10, 1973

[54] SKID CONTROL SYSTEM
[75] Inventor: Hugh E. Riordan, Ann Arbor, Mich.
[73] Assignee: Kelsey-Hayes Company, Romulus, Mich.
[22] Filed: Aug. 23, 1971
[21] Appl. No.: 174,277

Related U.S. Application Data
[63] Continuation of Ser. No. 859,776, Sept. 22, 1969, abandoned.

[52] U.S. Cl. ................. 303/21 P, 303/20, 303/21 F
[51] Int. Cl. .............................................. B60t 8/10
[58] Field of Search ...................... 188/181; 303/20, 303/21

[56] References Cited
UNITED STATES PATENTS
3,362,757  1/1968  Marcheron ...................... 303/21 P Primary Examiner—Milton Buchler
Assistant Examiner—Stephen G. Kuhin
Attorney—Harness, Dickey & Pierce

[57] ABSTRACT

A skid control system for a wheeled vehicle having a brake pressure modulator for relieving brake actuation in response to a first control signal which is representative of a detected skid condition and for modulating brake actuation thereafter in accordance with the sign and magnitude of second control signal which is representative of the sum of the rate of change of wheel acceleration during spin up and the rate of change of brake pressure.

7 Claims, 3 Drawing Figures

INVENTOR.
Hugh E. Riordan
BY
Harness, Dickey & Pierce
ATTORNEYS.

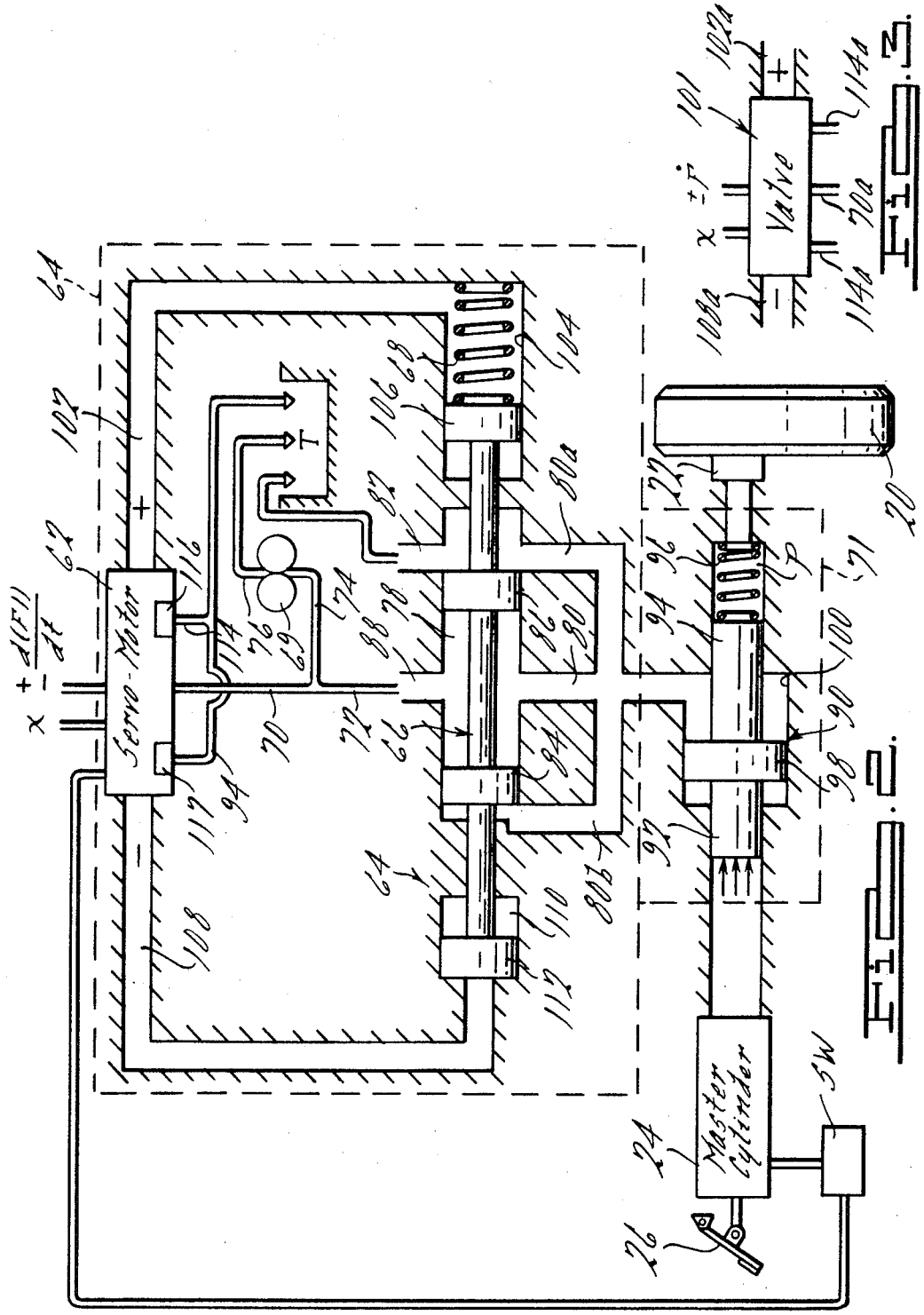

SKID CONTROL SYSTEM

CROSS REFERENCE TO RELATED APPLICATION

This application is a continuation of my copending application Ser. No. 859,776, filed Sept. 22, 1969 having like title and assigned to the same assignee as this application, now abandoned.

SUMMARY - BACKGROUND OF THE INVENTION

The present invention relates to vehicle braking systems and more particularly to a skid control system in which the retarding force is maximized during acceleration or spin up as a function of the brake pressure.

In the present invention braking effect is maximized by measuring only two parameters, brake pressure and wheel deceleration. These parameters are used to control braking, after initial brake release due to detection of an incipient skid condition to optimize braking during wheel recovery or spin up. Therefore, it is an object of the present invention to provide a novel and improved braking system.

It is another object of the present invention to provide a brake system which determines relative maxima of braking force as a function of brake pressure during wheel spin up and provides braking about these points; it is another object to provide a brake system of the prior type in which retarding force during wheel spin up is maximized as a function of brake pressure and the derivative of wheel acceleration.

It is another object of the present invention to provide a skid control system of the above described type.

Other objects, features, and advantages of the present invention will become apparent from the subsequent description and the appended claims, taken in conjunction with the accompanying drawings, in which:

FIG. 2 is a diagrammatic representation of the modulating valve for use in the system of FIG. 1; and FIG. 3 is a partial block diagram of a modified form of system.

Figure 1:
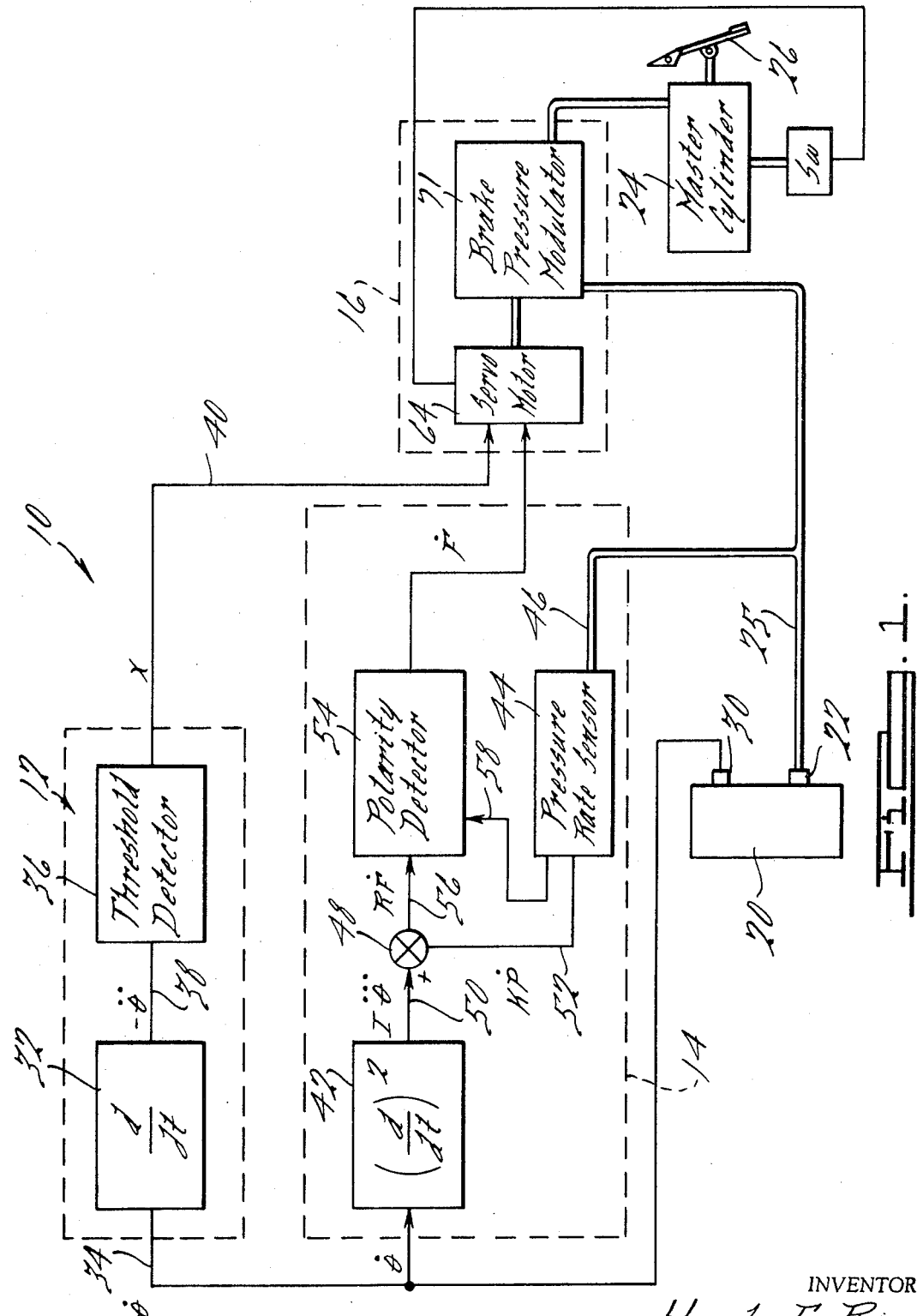
FIG. 1 is a block diagram exemplifying the system of the present invention.

In the present invention means are provided to detect an incipient skid condition; these means can take various forms such as slip detection, deceleration detection, etc.; to maximize braking, however, it has been found advantageous to control closely the braking during spin up or wheel acceleration. This is to avoid either a locked wheel condition or a condition of a wheel running at synchronous speed. Thus in the present invention braking during spin up is maximized by modulating pressure such as to provide maximum retarding force at the wheel.

In considering a wheeled vehicle the equation governing recovery or spin up for each braked wheel from a skid is:

$$I\ddot{\Theta} = FR - KP$$

For the above and subsequent equations the following symbols are used:
$F$ = Tangential force between the tire and road
$R$ = Rolling radius of tire
$I$ = Moment of inertia of tire and wheel
$\ddot{\Theta}$ = Angular acceleration of tire
$P$ = Brake pressure
$K$ = Constant (approximately for short time interval)

A skid control system which continuously maximized the retarding force, $F$, will minimize the stopping distance. Assuming that the rolling radius, $R$, is constant, it follows that $F$ can be obtained by measuring the brake pressure $P$ and the wheel acceleration $\ddot{\Theta}$. A servo-controlled pressure regulator or modulator in the brake line, to the wheel could be used to maximize $F$ during acceleration or spin up.

The brake pressure $P$ is initially determined by the vehicle operator. If the magnitude of pressure is too high such as to tend to cause skidding (locked wheel) this will be detected by means to be described, and brake pressure will be relieved to permit spin up. It is during this spin up or acceleration that the features of the present invention are most advantageously employed. In order to maximize braking effect the braking should be maintained such as to make the braking force, $F$, a maximum. This can be determined by differentiating the prior equation and solving for the derivative of braking force which yields the following:

$$I\dddot{\Theta} + K\dot{P} = R\dot{F}$$

If the sum of $I\dddot{\Theta}$ and $R\dot{P}$ is positive, then braking force, $\dot{F}$, must also be increasing and, to maximize retarding force, the brake pressure should be increased. If the sum is negative, then $\dot{F}$ is negative indicating excessive slip, i.e. retarding force decreasing, and the brake pressure should be reduced. Along the same line it is noted that to maximize the retarding force during wheel spin up the derivative $dF/dt$ is attempted to be held at or near zero. This is done by sensing the magnitude of $dF/dt$ and also by determining its sign. For increasing brake pressure if $dF/dt$ is positive it is approaching $dF/dt = 0$ and further increases in pressure should be permitted. If $dF/dt$ is negative it has passed through zero and the wheel is approaching skid (locked wheel) and further increases in pressure should be prevented and some pressure relief should be effected. For decreasing brake pressure when $dF/dt$ is positive it indicates that $F$ has crossed over the $dF/dt = 0$ or $F =$ maximum point and is returning towards $dF/dt = 0$ and further reductions in brake pressure are in order. When $dF/dt$ is negative it indicates that $F$ has returned over the $dF/dt = 0$ and is moving away from $dF/dt = 0$ and an increase in brake pressure is in order. In the system then of the present invention the retarding force $F$ is maximized during wheel spin up by applying or reducing brake pressure in accordance with the magnitude of $dF/dt$ and with the need for application or reduction in brake pressure being determined from the sign of $dF/dt$ and $dP/dt$. A system implementing the above concept is shown in FIG. 1.

Looking now to FIG. 1, there is shown a skid control system 10 including a wheel skid detection and control section 12 and a spin up or a wheel acceleration control section 14 and a pressure control section 16.

In FIG. 1 a braked wheel 20 has its brake wheel cylinder 22 controlled by a master cylinder 24 via fluid line 25 which in turn is actuated by the vehicle operator via a brake pedal and linkage 26. A pressure transducer 44 is connected to fluid line 25 and senses the rate of change of pressure to wheel cylinder 22 and provides an electrical output signal $K\dot{P}$ indicative of this rate of change. An electrical pick-up 30 provides a signal $\dot{\Theta}$ to both sections 12 and 16. The signal $\dot{\Theta}$ is proportional to the speed of wheel 20.

In the section 12 the velocity signal is transmitted to a first rate section 32 via conductor 34. The section 32 differentiates the velocity signal $\dot{\theta}$ and provides a deceleration signal $-\ddot{\theta}$ the magnitude of which is indicative of the deceleration of the wheel 20. This signal is in turn transmitted to a threshold detector section 36 via conductor 38. If the deceleration signal $-\ddot{\theta}$ exceeds a preselected magnitude indicative of an incipient skid condition then an output signal $x$ will be transmitted via conductor 40 to the pressure control section 16 whereby pressure to the brake 22 will be immediately relieved. With pressure relieved the wheel 20 will then be able to spin up. As spin up occurs the deceleration signal $-\ddot{\theta}$ and output signal $x$ will terminate. At this time, however, the spin up control section 16 will be actuated to control the pressure to the brakes 22 to maximize retarding force $F$. Thus the velocity signal $\dot{\theta}$ is transmitted to a second rate section 42 in which the second derivative of the velocity signal $\dot{\theta}$ is taken and multiplied by a suitable factor (to simulate $I$) to provide $I\dddot{\theta}$. At the same time the pressure rate sensor section 44 senses the pressure at brakes 22 via line 46 and provides the output signal indicative of the time rate of charge of pressure multiplied by a suitable factor (to simulate $K$) to provide $K\dot{P}$.

The term $I\dddot{\theta}$ is transmitted to addition section 48 via conductor 50 while the term $K\dot{P}$ is transmitted to addition section 48 via conductor 52. As noted the sum of $I\dddot{\theta}$ and $K\dot{P}$ will yield $R\dot{F}$ which signal is transmitted to polarity detector section 54 via conductor 56. At the same time the pressure rate signal $K\dot{P}$ is also transmitted to detector section 54 via line 58. The polarity detector provides an output signal representative of $\dot{F}$ and having a sign as determined by the sign of the sum of $I\dddot{\theta}$ and $K\dot{P}$ and the sign of $K\dot{P}$. The sign of $\dot{F}$ from the polarity detector 54 will be in accordance with the following table:

$\dot{F} = I\dddot{\theta} + K\dot{P}$ $\dot{P}$ Polarity Detector 54
+   +   +
−   +   −
−   −   +
0   +   +
0   −   −

A positive sign from detector 54 indicates that an increase in brake pressure should occur, while a negative sign indicates that pressure should be decreased. Thus for the first case, if $\dot{F}$ is increasing, i.e. $(I\dddot{\theta} + K\dot{P})$ is positive, when pressure $P$ is increasing, i.e. $\dot{P}$ is positive, then pressure should be increased further. For the second case when $\dot{F}$ is decreasing with increasing pressure ($\dot{P}$) it means that too much brake pressure is being applied and the pressure should be decreased. For the third case when $\dot{F}$ is decreasing with a decrease in pressure ($\dot{P}$) it means that the brake pressure should be increased. When $\dot{F}$ is zero, the retarding force $F$ is a maximum and brake pressure should be maintained, i.e. neither increased nor decreased. This will occur in a manner to be described. The sign of the signal from the polarity detector 54 can be readily determined by known logic circuits to provide the sign as indicated in the preceding table. Thus the output signal $\dot{F}$ will have a magnitude indicative of the rate of change of the retarding force $F$ and will have a sign, as provided by polarity detector 54, indicative of whether the brake pressure should be increased or decreased. Since maximum retarding force occurs when $\dot{F} = 0$, the brake pressure can be increased or decreased at a rate determined by the magnitude of $\dot{F}$. The signal $\dot{F}$ will then be transmitted to the pressure control section 16 to modulate the brake pressure in a manner to be described.

One form of apparatus for pressure control section 16 is shown in FIG. 2 diagrammatically (without seals, vents, etc.). Referring to FIG. 2, a servo motor section 64 is energized through a stop light switch SW. In the unenergized state, a servo motor value 62 is in its neutral position. At the same time a control valve 64 has a spool 66 biased to the left by a spring 68 at its right hand end. A pump 69 provides fluid pressure to output lines 70 and 72 via outlet line 74. The pump 69 has a return line 76 connected to tank T. The outlet line 70 is connected to servo motor 62 while outlet line 72 is connected to an inlet chamber 78 of valve 64. Chamber 78 has an outlet line 80 and a return line 82 which is connected to tank T. The spool 66 has lands 84 and 86 located on opposite sides of inlet 88 which is connected to outlet line 72. The land 86 is proximate to return line 82. Outlet lines 80a and 80b are connected from outlet line 80 to opposite ends of lands 84 and 86. In the position shown, fluid is freely circulated from pump 68 to tank T via line 80a to the right hand portion of chamber 78 and line 82; hence little pressure will be developed at output line 80; note that the pressure on spool 66 is balanced by equal pressure on both sides of lands 84 and 86. The master cylinder 24 operates through a modulation section 71 via a modulating floating piston 90 to apply pressure to wheel cylinder 22. Thus piston 90 has one rod portion 92 connected to line 25 to wheel cylinder 22. A spring 96 normally biases the floating piston 90 to its deactuated position as shown. Upon actuation of master cylinder 24 via pedal 26 pressurized fluid from master cylinder 24 moves the floating piston 90 to the right to energize the wheel cylinder 22. The piston 90 has a head portion 98 located in a cylinder 100 with the end of the cylinder 100 receiving rod portion 94 being connected to outlet ine 80. Thus fluid pressure in line 80 will affect the position of floating piston 90 and hence will affect the pressure P to wheel cylinder 22. In the deactuated condition of servo motor valve 62 and with spool 66 in the position shown minimum pressure will be developed in cylinder 100 and hence the position of piston 92 and pressure P will be determined solely by actuation of the vehicle operator. The position of servo motor valve 62 (when energized) will be determined by the magnitude of the error signal $\dot{F}$. The servo valve 62 is a flow control valve and its flow rate is proportional to its position and hence to the magnitude of the error signal. For a negative error signal servo 62 will be actuated to provide flow to the right side of valve spool 66 and for a positive error signal servo 62 will be actuated to provide flow to the left side of valve spool 66. Thus servo 62 has one control line 102 connected to a chamber 104 with the flow in line 102 acting on a land 106 of spool 66 which is supported in chamber 104. The flow in chamber 104 will urge the spool 66 to the left. Spring 68 is also located in chamber 104 to act on land 106 to urge spool 66 to the left. Servo 62 has a second control line 108 connected to a chamber 110 with the flow in line 108 acting on a land 112 of spool 66 which is supported in chamber 110 to urge the spool 66 to the right.

To provide proportional modulation of brake pressure $P$ the servo 62 is designed to have a position proportional to the magnitude of and in the direction of the sign of the error signal $\dot{F}$.

Thus for a negative error signal the line 108 will have flow proportional to the magnitude of the error signal and for a positive error signal line 102 will have flow similarly proportional. In operation, with a negative signal, the servo motor 62 will be actuated to a condition where line 108 will be subject to flow and spool 66 will be moved to the right against spring 68 at a rate proportional to the flow rate in line 108. This in turn will move land 86 towards positions partially blocking or restricting passages 80a and 82. This will result in an increase in pressure in chamber 78 and hence in cylinder 100 which will result in a force on piston 90 acting to relieve pressure P. This latter force will vary with the size of the restriction and will vary at a rate proportional to the magnitude of the error signal. When the error signal is positive, flow is caused in line 102 to move spool 66 towards the left to decrease pressure on piston 90 and permit increase of brake pressure P.

Initially valve spool 66 is biased to its left-most position by the spring 68 and the output of servo-valve 62 is dumped to tank T via line 114 via a relief valve 116. A similar relief valve 118 dumps pressure to tank T at a selected high pressure when opposite line 108 is pressurized for negative error signals; in this condition fluid flow acting on land 112 moves spool 66 to the right.

Assuming now the occurrence of a skid condition, signal $x$ will be transmitted to servo motor section 64; the signal $x$ is of a selected high magnitude to cause servo motor 62 to be placed in its maximum flow rate condition whereby valve 66 will be actuated at its maximum rate to the right to provide pressure in chamber 100 to relieve the brake pressure $P$ at the maximum rate. As noted, this rapid relief will permit the wheels 20 to spin up; when acceleration of wheel 20 begins signal $x$ no longer exists and control of brake pressure is solely as a result of signal $\dot{F}$ which provides for brake pressure modulation in the manner previously described. Note that in the system as shown and described the pressure $P$ cannot exceed that magnitude set by the vehicle operator. Also note that the signal $x$ will override and control with regard to the signal $\dot{F}$. When $\dot{F}$ is zero the servo 62 will maintained in a position at which the flow rate will be zero and valve 66 will be maintained at its last position holding the pressure $P$ constant. Upon release of the brakes by the vehicle operator switch SW will be deactuated resulting in servo motor 62 being deactuated to its initial condition.

In the system shown and described the brake pressure is being continuously modulated in accordance with the magnitude of the error signal. The system could be modified to provide "on" or "off" operation whereby a constant flow is provided from the control valve 64 to provide control pressure to the floating piston 90. This can be accomplished by substituting a two-position valve for the servo-valve 62. In FIG. 3 components similar to like components in FIG. 2 have been given the same numerical designation with the addition of the postscript "a". Thus in FIG. 3 a two-position valve 101 has outlet lines 102a and 108a and is responsive to the error signal F attaining a selected magnitude whereby the valve 101 will be positioned to energize fluid line 108a for a positive error signal and fluid line 102a for a negative error signal. This will result in an "on" and "off" type operation in which the brake pressure P will alternately be relieved and reapplied to provide control. Since in the "on" and "off" system brake pressure will be relieved and/or reapplied at a constant rate, the pressure rate sensor 44 can be simplified to merely sense whether the pressure is increasing or decreasing to provide the proper sign for the pressure rate, $\dot{P}$, signal which can be a fixed quantity. With such an "on" - "off" system, the valve 101 would be operative to either "on" or "off" and hence when $\dot{F} = O$, hunting on either side of $\dot{F} = O$ would occur thus maintaining retarding force F near maximum.

While it will be apparent that the preferred embodiments of the invention disclosed is well calculated to fulfill the objects above stated, it will be appreciated that the invention is susceptible to modification, variation and change without departing from the proper scope or fair meaning of the invention.

What is claimed is:

1. In a skid control system for controlling fluid pressure actuated brakes of at least one wheel of a wheeled vehicle by controlling the fluid pressure to the brakes, said system comprising: modulating means responsive to a first control signal for relieving the pressure to the brakes and to a second control signal for modulating the magnitude of the fluid pressure to the brakes as a function of the sign and magnitude of said second control signal, skid detection means for detecting the occurrence of an incipient skid condition at the one wheel and for providing said first control signal to said modulating means in response thereto, second means including pressure transducer means for providing an indication of the mangitude of the rate of change of brake pressure and an indication of the sign of the rate of change of brake pressure for providing said second control signal during spin-up of the wheel and for varying said second control signal as said function of said indication of the magnitude of the rate of change of brake pressure and said indication of the sign of the rate of change of the brake pressure.

2. The system of claim 1 with said second means varying the magnitude of said second control signal as a function of the magnitude of the rate of change of acceleration of the wheel.

3. The system of claim 2 with said second means varying the magnitude of said second control signal in accordance with the sum of said rate of change of acceleration and of said rate of change of brake pressure whereby the magnitude of said second control signal is indicative of the magnitude of the rate of change of retarding force at the one wheel.

4. The system of claim 3 with said modulating means responsive to said second control signal to maintain the rate of change of retarding force to be approximately zero.

5. The system of claim 4 with said modulating means increasing or decreasing pressure in accordance with the sign of said second control signal, said second means determining the sign of said second control signal in accordance with the sign of said sum and of said rate of change of brake pressure.

6. In a skid control system for controlling fluid pressure actuated brakes of at least one wheel of a wheeled vehicle by controlling the fluid pressure to the brakes, said system comprising: modulating means responsive to a first control signal for relieving the pressure to the brakes and to a second control signal for modulating the magnitude of the fluid pressure to the brakes as a function of the sign and magnitude of said second control signal, skid detection means for detecting the occurrence of an incipient skid condition at the one wheel and for poroviding said first control signal to said modulating means in response thereto, second means for providing said second control signal during spin-up of the one wheel after said pressure to the brakes is relieved including pressure transducer means for providing an indication of the magnitude of the rate of change of brake pressure and an indication of the sign of of the rate of change of the brake pressure, and means for detecting the rate of change of acceleration of the one wheel during spin-up, said second means including means varying said second control signal as a function of the sum of the magnitude of said rate of change of acceleration and the magnitude of said rate of change of brake pressure so that the magnitude of said second control signal is indicative of the magnitude of the rate of change of retarding force at the one wheel and for additionally varying the sign of said second control signal as a function of the sign of the rate of change of the brake pressure.

7. In a skid control system for controlling fluid pressure actuated brakes of at least one wheel of a wheeled vehicle by controlling the fluid pressure to the brakes, said system comprising: modulating means responsive to a first control signal for relieving the pressure to the brakes and to a second control signal for modulating the fluid pressure to the brakes as a function of the sign and magnitude of said second control signal, skid detection means for detecting the occurrence of an incipient skid condition at the one wheel and for providing said first control signal to said modulating means in response thereto, and second means including pressure transducer means for detecting the magnitude of the rate of change of the brake pressure for providing said second control signal during spin-up of the wheel and for varying said second control signal as said function of the magnitude of the rate of change of the brake pressure.

* * * * *